United States Patent Office 3,457,321
Patented July 22, 1969

3,457,321
DIMERISATION PROCESS
James Keith Hambling, Frimley, near Aldershot, and John Robert Jones, Walton-on-Thames, England, assignors to The British Petroleum Company, London, England, a corporation of Great Britain
No Drawing. Filed Apr. 13, 1967, Ser. No. 630,514
Claims priority, application Great Britain, Apr. 25, 1966, 17,903/66
Int. Cl. C07c 3/10
U.S. Cl. 260—683.15                15 Claims

ABSTRACT OF THE DISCLOSURE

Linear dimers are prepared by dimerising an alpha olefin in the presence of a catalyst comprising a complex organic compound of a metal of Group VIII, a reducing agent and a tin tetra alkyl compound.

---

This invention relates to a process for the production of dimers of alpha olefins.

Our copending application Ser. No. 558,588 filed June 20, 1966 discloses a process for the production of a product consisting predominantly of linear dimers which process comprises dimerising an alpha olefin in the presence of a catalyst comprising a complex organic compound of a metal of Groups Ib or VIII of the Periodic Table according to Mendeleef and a reducing agent at a temperature in the range −40 to +200° C. under such conditions of pressure that the reactants are maintained in the liquid or paritally condensed phase.

We have now discovered that the presence of a tin tetra-alkyl compound increases the activity of the catalyst. Thus according to the present invention there is provided a process for the production of a product containing predominantly linear dimers which process comprises dimerising an alpha olefin in the presence of a catalyst comprising a complex organic compound of a metal of Groups Ib or VIII of the Periodic Table according to Mendeleef, a reducing agent and a tin tetra-alkyl compound at a temperature in the range −40 to +200° C. under such conditions of pressure that the reactants are maintained in the liquid or paritally condensed phase.

The preferred complex organic compound is nickel acetyl-acetonate.

Preferably the moisture content of the nickel acetyl-acetonate is reduced to below 3% by weight before use. In general, the lower the moisture content, the better.

The preferred reducing agents are organo-aluminium compounds, most preferably aluminium alkyl alkoxides. The preferred aluminium alkyl alkoxide is aluminium diethyl ethoxide. Aluminium trialkyls e.g. aluminium triethyl are also suitable.

Aluminium dialkyl alkoxides are preferred because they react gently with the complex organic compound and catalysts of consistent quality are obtained in successive preparations. Some other reducing agents e.g. aluminium trialkyls, react more vigorously and render temperature control of the catalyst preparation more difficult. As a result it is more difficult to obtain catalysts of consistent quality. Nevertheless, useful catalysts are obtained from such agents.

Preferably the reaction is effected under a pressure in the range 200 to 2000 p.s.i.g. for ethylene, propylene or butene-1. Pressures as low as atmospheric may be used for the dimerisation of higher alpha olefins.

Preferably the molar ratio of the Group Ib or VIII compound to the reducing agent is in the ratio 1.0:0.5 to 1.0:2.0.

Preferably the molar ratio of the Group Ib or VIII compound to the tin tetra-alkyl compound is in the ratio of 1.0:0.1 to 1.0:2.0.

Suitable tin tetra-alkyl compounds include tetra-ethly tin and tetrabutyl tin.

A very suitable alpha olefin for dimerisation is propylene.

Preferably catalyst manufacture is effected in the presence of a diluent or solvent. Suitable diluents include normally liquid aliphatic hydrocarbons and halogenated aliphatic hydrocarbons. Suitable solvents include aromatic hydrocarbons, e.g. benzene and toluene, and halogenated aromatic hydrocarbons. It is preferred that a solvent be employed rather than a diluent since this gives a homogenous catalyst system.

The catalyst must be preserved from contact with water, oxygen, alcohols, ethers, amines, phosphines, sulphur compounds, dienes, acetylenes, carbon monoxide and other ligands which displace olefins from nickel complexes and destroy the catalyst.

The invention is illustrated by the following examples.

EXAMPLE 1

2.5 g. anhydrous nickel acetyl acetonate were slurried in 21 g. heptane at 0° to 5° C. 2.0 ml. aluminium diethyl ethoxide were added dropwise to the mixture which was stirred magnetically over a 30 minute period. Admixture was carried out in an atmosphere of dry, oxygen free, nitrogen. The total mixture was transferred to a 1 litre stainless steel rocking autoclave which was then pressured with propylene at 600 p.s.i.g. and 40° C. After a reaction period of 16½ hours, the total reaction products were collected in traps cooled by solid carbon dioxide and acetone. 70 g. total polymer were obtained. This was found to contain 83% hexenes. The hexene fraction contained 78% linear hexenes and 8.3% 2-methylpentene-2.

It is to be understood that Example 1 is provided for purposes of comparison only and that operation of a process as described in Example 1 is not operation of a process in accordance with the present invention.

EXAMPLES 2–4

Example 1 was repeated with various modifications.

Reaction conditions and product analyses are set out in the following table.

TABLE.—EFFECT OF TETRAETHYL TIN
[Propylene polymerisation in 1 litre rocking autoclaves at 40° C./600 p.s.i.g.]

| | $Ni(AcAc)_2$ (g.) | $AlEt_2OEt$ (cc.) | $SnEt_4$ (g.) | Mole ratio Ni:Al:Sn | Heptane (g.) | Percent water in $Ni(AcAc)_2$ | Reaction time (h.) | polymer (g.) | Percent $C_6$ in polymer | Hexenes Percent $nC_6$ | Hexenes Percent 2MP2 | Activity, g./g. $Ni(AcAc)_2$/h. |
|---|---|---|---|---|---|---|---|---|---|---|---|---|
| 1 | 2.5 | 2.0 | | 1.0:1.35:0.0 | 21 | 2.7 | 17.8 | 70 | ca. 85 | 78.0 | 8.3 | 1.6 |
| 2 | 2.5 | 2.0 | 2.0 | 1.0:1.35:0.88 | 21 | 2.7 | 16.8 | 89 | ca. 85 | 77.0 | 8.3 | 2.1 |
| 3 | 1.9 | 1.5 | 2.0 | 1.0:1.35:1.15 | 21 | 2.7 | 17.0 | 69 | 80 | 76.5 | 9.1 | 2.1 |
| 4 | 2.5 | ¹2.5 | 1.0 | 1.0:1.9:0.44 | 25 | | 16.5 | 103 | 85 | 76.5 | 9.2 | 2.5 |

¹ $AlEt_3$.
NOTE.—Polymerisation effected at 40° C. and 600 p.s.i.

What we claim is:

1. A process for the production of a product containing predominantly linear dimers which process comprises dimerising an alpha mono-olefin in the presence of a catalyst comprising nickel acetyl-acetonate, a reducing agent comprising an organo-aluminium compound and a tin tetra-alkyl compound at a temperature in the range −40 to +200° C. under such conditions of pressure that the reactants are maintained in the liquid or partially condensed phase.

2. A process according to claim 1 where the moisture content of the nickel acetyl-acetonate is reduced to below 3.0% by weight before use.

3. A process according to claim 1 where the organo-aluminium compound is an aluminium alkyl alkoxide.

4. A process according to claim 3 where the aluminium alkyl alkoxide is aluminium diethyl ethoxide.

5. A process according to claim 1 where the organo-aluminium compound is an aluminium trialkyl.

6. A process according to claim 7 where the aluminium trialkyl is aluminium triethyl.

7. A process according to claim 1 where the dimerisation is effected under a pressure in the range of 200–2000 p.s.i.g.

8. A process according to claim 1 where the molar ratio of nickel acetyl-acetonate to the reducing agent is in the ratio 1.0:0.5 to 1.0:2.0.

9. A process according to claim 1 where the molar ratio of nickel acetyl-acetonate to the tin tetra-alkyl compound is in the ratio 1.0:0.1 to 1.0:2.0.

10. A process according to claim 1 where the tin tetra-alkyl compound is tetra-ethyl tin or tetrabutyl tin.

11. A process according to claim 1 where the alpha mono-olefin is propylene.

12. A process according to claim 1 where the catalyst has been prepared in the presence of a solvent.

13. A process according to claim 12 where the solvent is benzene or toluene.

14. A process according to claim 1 where the catalyst has been prepared in the presence of a diluent.

15. A process according to claim 14 where the diluent is a liquid aliphatic hydrocarbon or halogenated hydrocarbon.

References Cited
UNITED STATES PATENTS

| | | | |
|---|---|---|---|
| 2,969,408 | 1/1961 | Nowlin et al. | 260—683.15 |
| 3,096,385 | 7/1963 | McConnell et al. | 260—683.15 |
| 3,136,747 | 6/1964 | Bonner | 252—429 X |
| 3,166,547 | 1/1965 | Loeb. | |
| 3,321,546 | 5/1967 | Roest et al. | 260—683.15 |
| 3,378,539 | 4/1968 | Nowlin et al. | 252—429 X |

PAUL M. COUGHLAN Jr., Primary Examiner

U.S. Cl. X.R.

252—431

PO-1050
(5/69)

UNITED STATES PATENT OFFICE
CERTIFICATE OF CORRECTION

Patent No. 3,457,321      Dated July 22, 1969

Inventor(s) James Keith Hambling and John Robert Jones

It is certified that error appears in the above-identified patent and that said Letters Patent are hereby corrected as shown below:

Column 1, line 4 -

"The British Petroleum Company"

should be

- - The British Petroleum Company Limited - -

SIGNED AND
SEALED
FEB 17 1970

(SEAL)
Attest:

Edward M. Fletcher, Jr.
Attesting Officer

WILLIAM E. SCHUYLER, JR.
Commissioner of Patents